Aug. 7, 1962 H. H. SANTI Re. 25,217

ACOUSTICAL ENCLOSURE TO SIMULATE ORGAN TONES

Original Filed April 25, 1955

Harris H. Santi

INVENTOR.

BY

Browning, Simms & Hyer

ATTORNEYS

United States Patent Office

Re. 25,21

Reissued Aug. 7, 196

25,217

ACOUSTICAL ENCLOSURE TO SIMULATE ORGAN TONES

Harris H. Santi, La Porte, Tex., assignor to Rototone, Inc., a corporation of Texas Original No. 2,847,081, dated Aug. 12, 1958, Ser. No. 503,609, Apr. 25, 1955. Application for reissue Aug. 19, 1959, Ser. No. 73,153

9 Claims. (Cl. 181—31)

Matter enclosed in heavy brackets [ ] appears in the original patent but forms no part of this reissue specification; matter printed in italics indicates the additions made by reissue.

This invention relates broadly to sound reproduction apparatus and, more particularly, to a speaker enclosure as a part of such apparatus which enables the reproduction of improved acoustical values.

Various enclosures have been devised for improving the tone quality of sound waves emanating from the speaker, and particularly the quality of bass notes or low frequency sound waves. Inasmuch as such notes do not travel in free air, an early development in this field was the infinite type baffle in which the back of the speaker cone was sealed off within an enclosure so as to enable the cone vibrations to drive pressurized air and thereby provide greater tone sensitivity.

However, the infinite type baffle provided little flexibility for sound waves of differing frequencies, and a later development introduced the bass reflex in which the back of the speaker was loaded by means of a valved or choked enclosure.

Of the commercially available speaker enclosures of which I am aware, the best alleged performance is the reproduction of sound waves down to 30 cycles. However, it is admitted that this is accomplished only with a 10 decibel loss. Furthermore, this particular enclosure is dependent for its operation upon building acoustics—i.e., it embodies a triangular construction for use in the corner of a room.

An object of the present invention is to provide a speaker enclosure capable of producing improved tone values independently of building acoustics.

Another object is to provide a speaker enclosure which enables the reproduction of bass tones not possible with prior enclosures and, more particularly the full bass range of a pipe organ without power loss.

A further object is to provide a speaker enclosure constructed in a novel manner to provide a considerably longer path of sound waves between opposite sides of the speaker cone than has been possible with prior enclosures of comparable size.

Still another object is to provide a speaker enclosure in which a stereophonic effect may be simulated with the use of a single speaker.

It has heretofore been proposed to simulate the reverberation effect of organ music by what is known as a tremulant which comprised a rotatable blade positioned within the speaker cone or a channel or duct within a speaker enclosure. The result has been a baffling of the sound waves and a consequent variation of intensity.

An object of this invention is to provide a speaker enclosure in which a truer pipe organ effect may be obtained and, more particularly, in which such sound may be simulated without baffling.

Other objects, advantages and features of this invention will be apparent to one skilled in the art upon a consideration of the written specification, the attached claims and the annexed drawings.

In the drawings, wherein like reference characters are used throughout to designate like parts:

Figure 1:
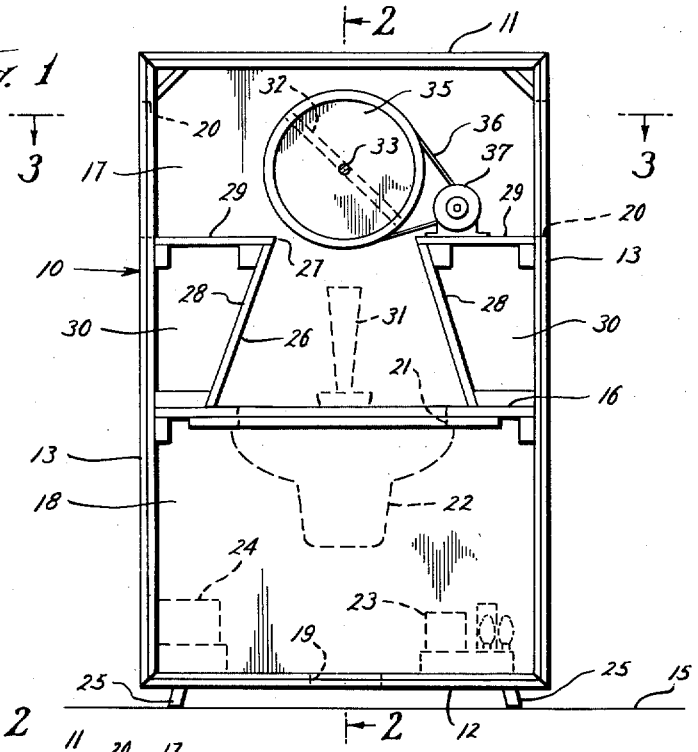
FIG. 1 is a vertical sectional view of an illustrative embodiment of the acoustical enclosure of the prese invention mounted or standing in a preferred positic with respect to the floor or other support.

According to one of its novel aspects, the speaker e closure of the present invention [cludes] *includes* a char ber on the front side of the speaker cone which lengthe the travel of sound waves between the front and back the cone, and thus improves the tone quality, as previous mentioned. In addition, this upper chamber is provid with outlet openings through opposite sides thereof su that the sound emanating from the speaker may be spre rather than being directed to the audience, thus produci a stereophonic effect with only a single speaker. St further, the upper chamber of the speaker enclosu while not actually choking the sound waves emanati from the speaker, does provide a certain loading eff upon the front of the speaker cone which further i proves the speaker sensitivity.

According to another of its novel concepts, this speak enclosure is provided with a passageway above the porti thereof for receiving the speaker cone which is cc structed to elongate the pattern of sound waves emanati from the speaker cone and thereby reproduce the f bass range of a pipe organ as previously mentione More particularly, the enclosure is provided with mea for receiving the speaker cone suspended within a low chamber in which the back of the cone may be loade and the afore-mentioned passageway is disposed in su rounding relation to the speaker cone receiving means its lower end from which it is convergent toward upper end so as to flatten out or elongate the patte of sound waves.

Preferably, the afore-mentioned novel aspects of t present invention are combined into an enclosure co prising a cabinet partitioned off into upper and low chambers and being closed except for an outlet from t upper chamber and an inlet to the lower chamber. T outlet from the upper chamber comprises the afo mentioned openings through opposite side walls of enclosure, and the afore-mentioned passageway opens i the upper chamber with its lower end surrounding opening through the partition which provides the afo mentioned speaker cone receiving means. Further, inlet to the lower chamber comprises a choke of a s so as to permit substantially no free air on the b side of the speaker cone and, as shown, is substantia axially aligned with the speaker cone receiving openi In accordance with a still further novel aspect of t invention, and particularly for use in the reproduction organ music, a blade similar to the tremulant rotors p viously mentioned may be mounted in the upper cham of the enclosure for rotation above the speaker cone ceiving means and about an axis which extends longitu nally of side walls for the enclosure through which ou openings are provided. Thus, the blade is operative divert sound waves emanating from the speaker from opening to the other. However, with the blade rotata mounted above the opening provided for receiving speaker cone, there is no muffling of the sound waves. the preferred embodiment of the invention, the abo described rotatable blade construction is combined w the sound wave pattern elongating passageway.

Referring now to a detailed description of the drawi the speaker enclosure shown therein is designated in entirety by the numeral 10 and comprises a cabinet hav and bottom walls 11 and 12, respectively, as well as posite side walls 13 and 14. In this respect, the terms p," "bottom" and "side," as well as corresponding ns, such as "upper" and "lower," are merely relative l do not necessarily define the position of the enclosure h respect to its support, such as the floor 15. That is, ough the upright position of the enclosure shown in GS. 1 and 2, in which bottom wall 12 is adjacent the r 15, is preferred, the enclosure may be disposed in er positions, as will be described hereinafter.

The walls of the enclosure may be made of any suitable ustical material, such as the laminated plywood which ndicated in the cross-sectional views of the drawings. walls are joined to one another in a secure manner as to prevent excessive vibration within the enclosure , further, to provide an air-tight interior for the inet.

Figure 2:
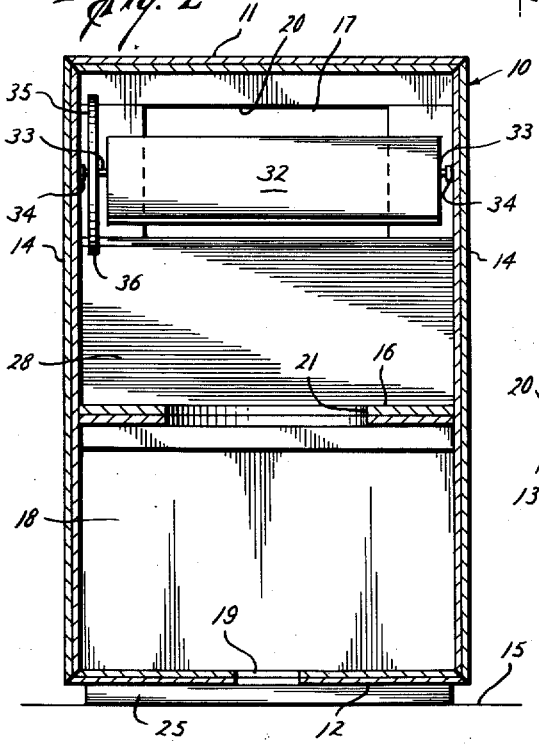
FIG. 2 is another vertical sectional view of the e closure but taken substantially along broken line 2—2 FIG. 1.

The cabinet is divided by a partition 16 extending subtially transversely between the side walls thereof into upper chamber 17 and a lower chamber 18. An inlet he lower chamber comprises a choke 19 through the om wall 12 and an outlet from the upper chamber prises openings 20 through opposite side walls 13 of cabinet. The cabinet is closed except for the inlet and et 19 and 20.

n opening 21 is provided through the partition 16 for iving a speaker, which is shown in FIG. 1 by the ntom lines as at 22, suspended within the lower cham- 18. More particularly, the opening 21 through the ition is provided for supporting and surrounding the er flared end of the speaker cone such that the back of the cone may be enclosed by the lower chamber nd the front side of the speaker cone enclosed by the er chamber 17.

s previously mentioned, the inlet 19 to lower chamber s a choke which enables loading of the back side of speaker cone by permitting substantially no free air in the lower chamber 18. As also mentioned previ- y, this construction is known in the art as the bass x and it is in this sense that the term "choke" is used. s, with the cross-sectional area of the choke so de- ed relative to the speaker and volume of the lower nber 18 as to enable the back side of the speaker cone drive pressurized rather than free air, the speaker is vided with greater sensitivity. Since this construction ch loads the back side of the speaker cone is known ccordance with earlier developments in the art, it l not be elaborated upon. However, by way of ex- le, I have employed with a 15-inch, 50 watt "Uni- ity" speaker suspended within a lower chamber of it five cubic feet, a choke having a cross-sectional of 40 square inches.

lso shown in phantom in FIG. 1 within lower cham- 18 is an amplifier 23 and suitable electrical controls Although it is conventional practice to place such pment within the enclosure back of the speaker cone, an arrangement is not an essential part of the pres- invention. Obviously, the disclosure of the present ntion has not been complicated by a showing of elec- l connections between the amplifier and the electro- netic generator of the speaker.

e bottom wall 12 of the cabinet is provided with ers or legs 25 which elevate the bottom wall above floor 15 or other support, thus permitting access to e 19. According to one novel aspect of this inven- the runners are disposed longitudinally of the side s 13 through which outlet openings 20 are provided are further imperforate for a length substantially tensive with such side walls, as shown in FIG. 2, such sound waves emanating from the speaker 22 are d to travel a distance considerably further than the est distance between the outlet and inlet. As a re- of the above-described arrangement of the upper ber 17, as well as the runners 25 in connection with t openings 20, the enclosure 10 provides a greater length of travel for sound waves between the front and back sides of the speaker cone than prior enclosures of comparable size.

Although the runners thus define a preferred position of the cabinet relative to the support 15, it should be understood, especially in connection with the "top," "bottom" and "side" wall designations, that the enclosure or cabinet may be laid with either of its side walls 14 or top wall 11 upon the support 15. With the outlet openings 20 disposed as shown, it is preferred that the cabinet not be laid upon either of its side walls 13; and, still further, that it not be disposed with either side wall 13 facing the audience, the reason for which will be more apparent hereinafter. However, if, for example, the outlet from upper chamber 17 consisted of one or more openings through top wall 11, there would be still further flexibility as to the position in which the speaker enclosure may be mounted. Although the foregoing is merely exemplary, it is obvious that the enclosure of the present invention is not restricted by building or room acoustics.

The area of outlet 20 from the upper chamber 17 is of such size as not to choke the sound waves emanating from the front of the speaker, but at the same time has a loading effect upon the front of the cone and thereby further increases its sensitivity. Also, with the outlet comprising openings 20 through opposite side walls 13, there is a spreading of the sound waves emanating from the speaker 22. Thus, with both outlets 20 exposed, and preferably facing transversely to the audience, there results a stereophonic effect which has heretofore been possible only with the use of two or more particularly located speakers. As will be understood hereinafter, this arrangement of outlet openings further enables the use of the improved tremulant type rotor blade of this invention.

The upper and lower chambers of the cabinet are connected by a passageway 26 which surrounds opening 21 at its lower end and is gradually convergent toward its upper end for elongating the pattern of sound waves emanating from the speaker 22. It will be understood that the sound waves at the flared end of the speaker cone which enter the passageway 26 correspond to the cross section of the speaker in that they have a substantially circular pattern. The bass tones or the pattern of low frequency sound waves at the periphery of the cone are flattened out or elongated by means of the converging passageway 26 such that it has been found possible to reproduce with the enclosure of this invention the full bass range of a pipe organ.

Thus, it can be seen from the drawings, that the width of opening 27 through the upper end of passageway 26 is less than the width of opening 21 in a corresponding direction of the flared end of the speaker cone. The desired result, as indicated above, is to flatten out rather than choke the sound. In other words, the circular pattern of the sound waves is transformed into an oval pattern.

In this respect, it is the width of the opening 27 through the upper end of passageway 26 which is critical inasmuch as, on the one hand, too large a width will permit free air and, on the other hand, too narrow a width will tend to muffle the sound such that many of the intermediate sound waves will not be audible. The length of the opening 27—i.e., in this instance the distance between side walls 14—is critical in that it should be at least long enough to accommodate the elongation of the sound waves in accordance with the narrowing of the width of the passageway or, in other words, its convergency. The critical width of the upper end of passageway 26 depends on a number of variables which will enable one skilled in the art to dimension the passageway to his own needs upon an experimental basis.

That is, there are several factors which will determine just how much the sound waves can be flattened out and still be audible. Such variables are the variation in voice coil diameters of the speaker, the variation in speaker cone flexibility, and the variation in wattage output of the speaker. With the speaker, lower chamber, and choke previously mentioned, I have successfully reproduced the full bass range of a pipe organ with a passageway having a width at its lower end corresponding approximately to the speaker diameter and at its upper end of approximately 10 inches, and a length of approximately 20 inches.

To my knowledge, this phenomenon of sound wave pattern elongation has not heretofore been put to practical use in the construction of speaker enclosures. As noted above, its application in the present invention is to reproduce bass tones or low frequency sound waves. In this sense, the bass tones are those generally having frequencies less than 250 cycles.

Referring now to the construction of passageway 26 it can be seen from the drawings that it is defined by two spaced apart and laterally extending inner walls 28. These walls extend between side walls 14 so as to define an elongated opening through the passageway extending in substantially the same direction as the side walls 13 through which outlet openings 20 are provided. Substantially horizontally disposed inner walls 29 are connected between side walls 13 beneath outlet openings 20 and the upper end of inner walls 28 so as to partition off spaces 30 in the upper chamber at each side of the passageway 26. These spaces may be left empty or may be filled with any suitable insulating material.

It will be understood that the above-described construction of passageway 26 is preferred principally because of its simplicity and minimum parts, although equivalent structures may be used. As can be seen from FIG. 1, the lower ends of inner walls 28 are disposed on opposite sides of the cone receiving opening 21 and are convergent upwardly therefrom to the open upper end 27 through the passageway.

For illustrative purposes, there is shown in phantom in FIG. 1 a second speaker 31 within the passageway 26 above the speaker 22. This speaker 31 may be of the type used for high frequency sound waves, particularly those above 2,000 cycles, and is thus positioned substantially coaxially of opening 21 and speaker 22 inasmuch as these high frequency sound waves follow substantially straight paths.

Figure 3:
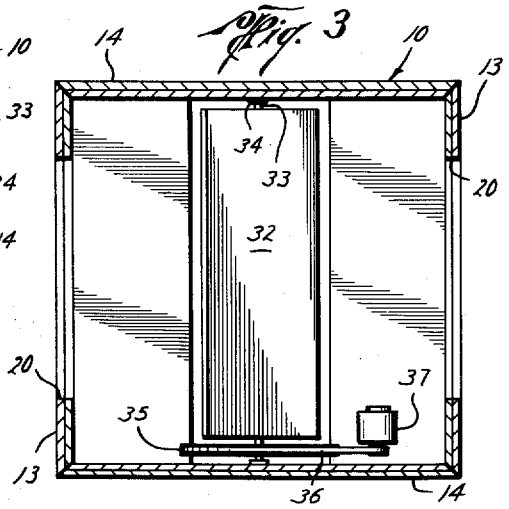
FIG. 3 is a horizontal sectional view of the upp chamber of the enclosure taken substantially along brok line 3—3 of FIG. 1.

The blade for simulating organ music is indicated in its entirety by the numeral 32 in each of FIGS. 1, 2 and 3, and would be incorporated into only those enclosures used for this purpose. As can be seen from the drawings, this blade is mounted in the upper chamber for rotation above the opening from which the speaker 22 is suspended and about an axis extending substantially longitudinally of the side walls 13 through which outlet openings 20 are provided. In this manner, assuming a rotation of the blade in a single directional sense, sound waves emanating from the front of the speaker 22 will be directed or diverted from one opening 20 and then to the other and, intermediate such diversions, the sound waves, rather than being muffled as in prior art structures, are spread between passage to each of said outlet openings.

It is thus important that the blade be mounted about an axis above the opening or, in the preferred form of the invention shown in the drawings, also above the outlet 27 through the open upper end of passageway 26. In this manner, with the blade 32 disposed in one angular position as shown in FIG. 1 the sound waves from passageway 26 are diverted into the outlet opening 20 in the left side wall 13 of the cabinet as it is shown in FIG. 1. However, as the blade is further rotated such that it reaches a substantially horizontal position, there will be no muffling or choking of the sound waves, but to the contrary, they will be permitted to pass outwardly through either of the outlet openings 20. Also, as shown in FIG. 1, the lower end of the blade 32 is so mounted as to be spaced a short distance from one edge or side opening 27 as it diverts sound waves to the outlet opening neare the opposite side.

It is further important that the blade extend lengtl wise substantially coextensively with the length of tl opening 27 through the upper end of the passageway 2 and that it be of a width greater than that of the upp end of such passageway. In this manner, the axis ( rotation of the blade may be disposed a distance less tha one-half of its width above the upper end of the pa sageway so that, in reaching a position such as is show in FIG. 1, substantially all of the sound waves emanatir from speaker 22 and passing outwardly through passag way 26 are diverted in a single direction and through single outlet opening. Obviously, non of the afor mentioned advantages and functions of the blade 32 a possible with the previously described tremulant roto of the prior art.

As mentioned above, it is preferred that the blade 3 be employed in connection with the sound wave patte elongating passage 26 although, as will be understoo the blade may be used solely in connection with tl speaker opening 21 in which case the relation of tl blade to such speaker opening would preferably co respond to the above-described relation of the blac to the opening 27 through the upper end of passagew 26. Also, of course, it is the disposal of outlet ope ings 20 through opposite side walls 13 which makes po sible the improved functioning of the blade 32 in sim lating organ music.

Referring more specifically to the drawings, it ca be seen that the blade itself is provided with stub shaf 33 supported in bearings 34 at opposite ends at the si walls 14. The blade is rotated by means of a pulley 3 on one of the stub shafts and carrying a belt 36 whic is driven by any suitable motor 37. As shown in tl drawings, one of the substantially horizontally dispos inner walls 29 provides a support for the motor 37.

In a preferred construction of the enclosure, the tc wall 11 is disposed at a level relatively close to the upp end of the blade 32 when it is vertically disposed suc that leakage across the top of the blade in such vertic position will be kept to a minimum. The speed at whic the blade will be rotated is determined, of course, l the simulated effect it is desired to obtain.

From the foregoing it will be seen that this inventic is one well adapted to attain all of the ends and objec hereinabove set forth, together with other advantag which are obvious and which are inherent to the a paratus.

It will be understood that certain features and su combinations are of utility and may be employed wit out reference to other features and subcombination This is contemplated by and is within the scope of tl claims.

As many possible embodiments may be made of tl invention without departing from the scope thereof, it to be understood that all matter herein set forth or show in the accompanying drawings is to be interpreted as lustrative and not in a limiting sense.

The invention having been described, what is claim is:

1. An acoustical enclosure [for] *with* a speaker *ha ing a speaker cone,* comprising a cabinet having an ir perforate top, a bottom and side walls and a partitic extending between the side walls to divide the cabin into upper and lower chambers, said cabinet being clos except for an outlet from the upper chamber and an i let to the lower chamber which comprises a chol through the bottom wall, the partition being provid with an opening for receiving [a] *the* speaker cone su pended within the lower chamber above the choke, tl outlet from the upper chamber comprising outlet ope ings through opposite side walls of the cabinet of a si to produce a loading effect upon the front of the speak cone, the bottom wall of the cabinet provided with ru ners extending longitudinally of the side walls throug ich the outlet openings are provided and at opposite
es of the choke, said runners being imperforate for
gthening the travel of sound waves between each of
outlet openings and choke.

. An acoustical enclosure [for] *with* a speaker *hav-*
*a speaker cone,* comprising a cabinet having upper
l lower chambers and being closed except for an out-
from the upper chamber and an inlet to the lower
mber which comprises a choke through the bottom
l thereof, a passageway *in the upper chamber and*
*nected to the lower chamber* [connecting the upper
l lower chambers], and means at the lower end of
passageway having a substantially circular opening
rethrough for receiving [a] *the* speaker cone suspend-
within the lower chamber, said passageway surround-
the substantially circular opening through the speaker
e receiving means at its lower end and being grad-
ly convergent upwardly to an elongate portion at its
er end connecting with the upper chamber, the area
said elongate portion being substantially that of the
stantially circular opening through the speaker cone
eiving means for transforming the sound waves
anating from the cone from a circular to an oval
tern.

. Sound reproduction apparatus, comprising a cabinet
ing top, bottom and side walls, a partition extending
ween the side walls to divide the cabinet into upper
l lower chambers, *said partition having an opening,*
l cabinet being closed except for *having* an outlet
n the upper chamber and an inlet to the lower cham-
which comprises a choke through the bottom wall, a
aker cone received through [an] *said* opening in the
tition for suspension within the lower chamber, and
assageway in the upper chamber having a substantially
ular portion at its lower end in surrounding relation
the partition opening and communicating through its
er end with the outlet, said passageway being gradu-
convergent from said substantially circular portion
its lower to a substantially elongate portion at its
er end, the area of said elongate portion being sub-
tially that of the outlet from the speaker cone for
sforming the sound waves emanating from the cone
n a circular to an oval pattern.

. Sound reproduction apparatus of the character de-
d in claim 3, wherein the outlet from the upper cham-
comprises an opening through a side wall thereof,
top wall being imperforate, and the upper portion
the passageway being elongated in a direction of the
wall through which the outlet opening is provided.

. Sound reproduction apparatus of the character de-
d in claim 4, wherein the outlet from the upper
mber also includes an opening through a side wall
osite and parallel to the side wall through which the
-mentioned outlet opening is provided.

. An acoustical enclosure [for] *with* a speaker *having*
*peaker cone,* comprising a cabinet having top, bottom
side walls and a [partion] *partition* extending be-
en the side walls to divide the cabinet into upper and
er chambers, said cabinet being closed except for
outlet from the upper chamber comprising openings through *two* opposite side walls thereof, the top wall being imperforate, [and an inlet to the lower chamber comprising a choke through the bottom wall thereof,] the partition provided with an opening for receiving [a] *the* speaker cone suspended within the lower chamber, *said cabinet comprising baffle means at the rear of the speaker for minimizing the cancellation of energy from the speaker,* and a blade mounted in the upper chamber for rotation above said opening about an axis extending in the direction of the side walls through which the outlet openings are provided, *and substantially parallel to the plane of the partition.*

7. An acoustical enclosure [for] *with* a speaker *having a speaker cone and mouth,* comprising a cabinet having upper and lower chambers closed except for an outlet from the upper chamber comprising openings through *two* opposite side walls thereof, the top wall being imperforate, [and an inlet to the lower chamber comprising a choke through the bottom wall thereof,] a passageway *in the upper chamber and connected to the lower chamber* [connecting the upper and lower chambers], means at the lower end of the passageway for receiving [a] *the* speaker cone suspended within the lower chamber, *said cabinet comprising baffle means enclosing the rear of the speaker for minimizing the cancellation of energy from the speaker,* and a blade mounted in the upper chamber above the upper end of the passageway for rotation about an axis extending in the direction of the side walls through which the outlet openings are provided, *and parallel to the mouth of the speaker.*

8. An acoustical enclosure of the character defined in claim 7, wherein the blade extends lengthwise substantially from side wall to side wall of the cabinet and is of a width greater than that of the upper end of the passageway, and the axis of rotation of the blade is disposed a distance less than one half of its width above said upper end of the passageway.

9. An acoustical enclosure of the character defined in claim 7, wherein the passageway is gradually convergent from a substantially circular portion at its lower end surrounding said speaker cone receiving means to an elongate portion at its upper end for transforming the sound waves emanating from the speaker cone from a circular to an [ovel] *oval* pattern.

References Cited in the file of this patent or the original patent

UNITED STATES PATENTS

| | | |
|---|---|---|
| 2,062,515 | Hoschke | Dec. 1, 1936 |
| 2,412,212 | Gerlat | Dec. 10, 1946 |
| 2,441,425 | Lawrence | May 11, 1948 |
| 2,618,352 | Leslie | Nov. 18, 1952 |

FOREIGN PATENTS

| | | |
|---|---|---|
| 641,668 | Great Britain | Aug. 16, 1950 |

OTHER REFERENCES

Publication: "The Karlson Enclosure," by Karlson Associates, Inc. (page 30 is most pertinent).